Patented Apr. 21, 1936

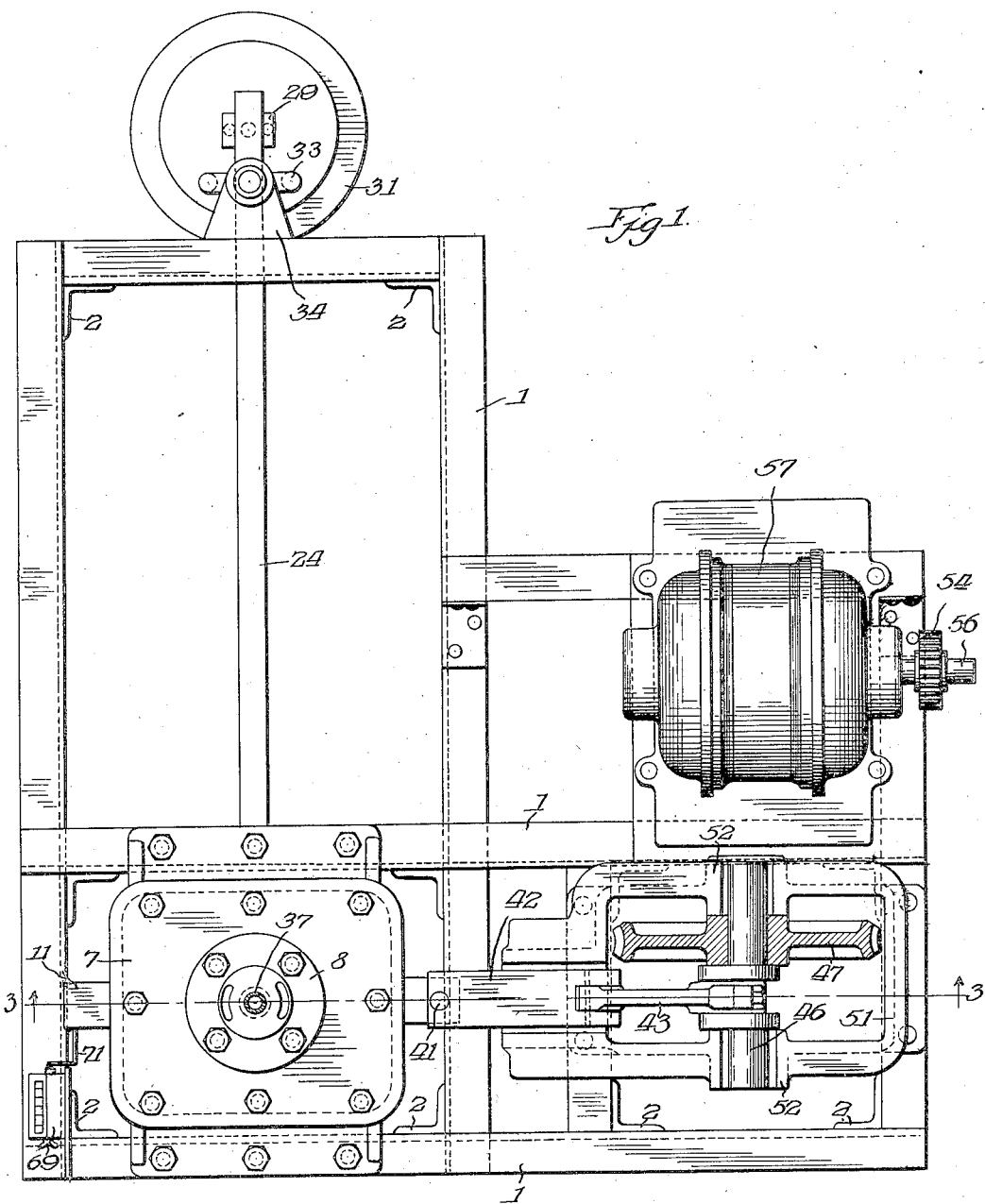

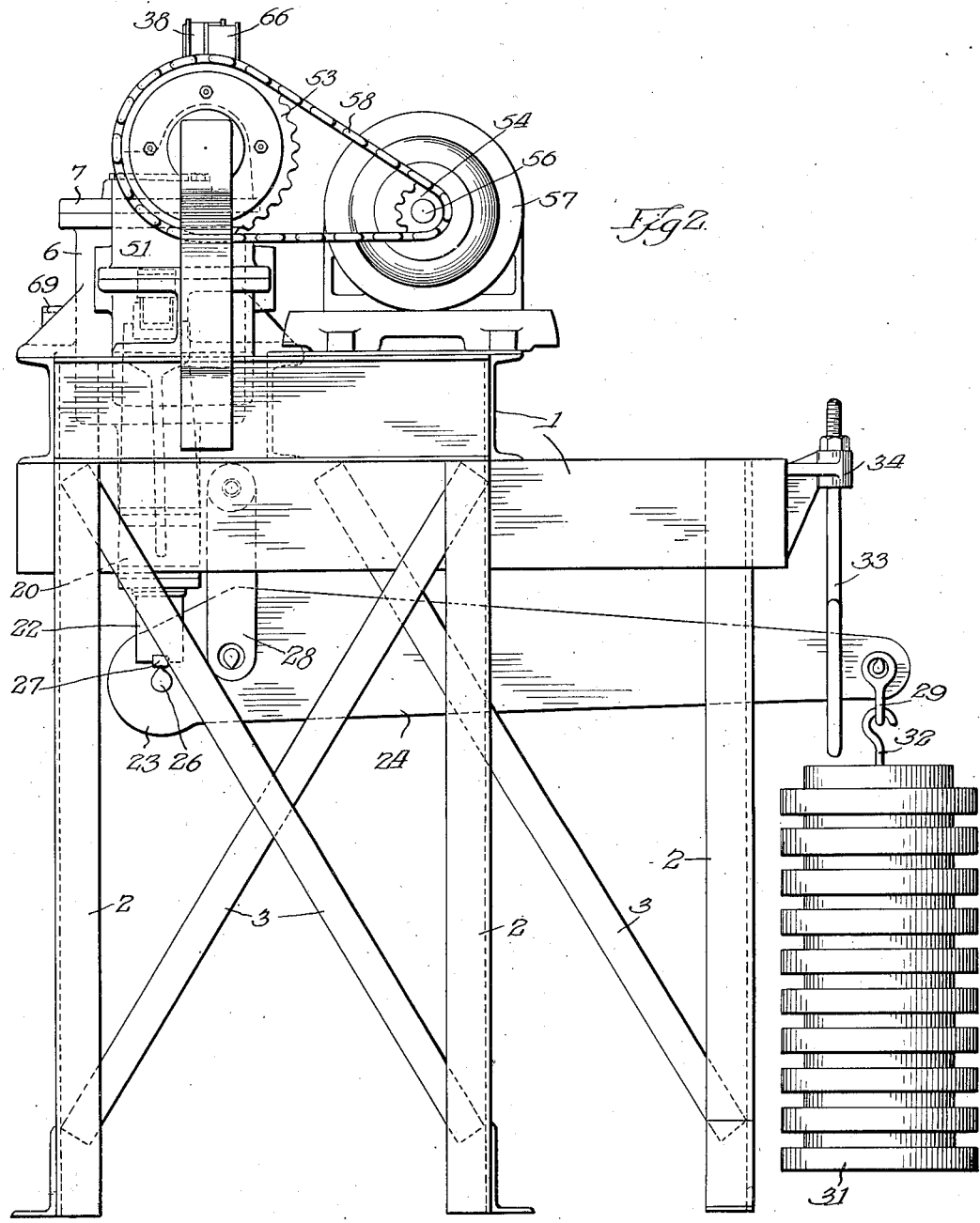

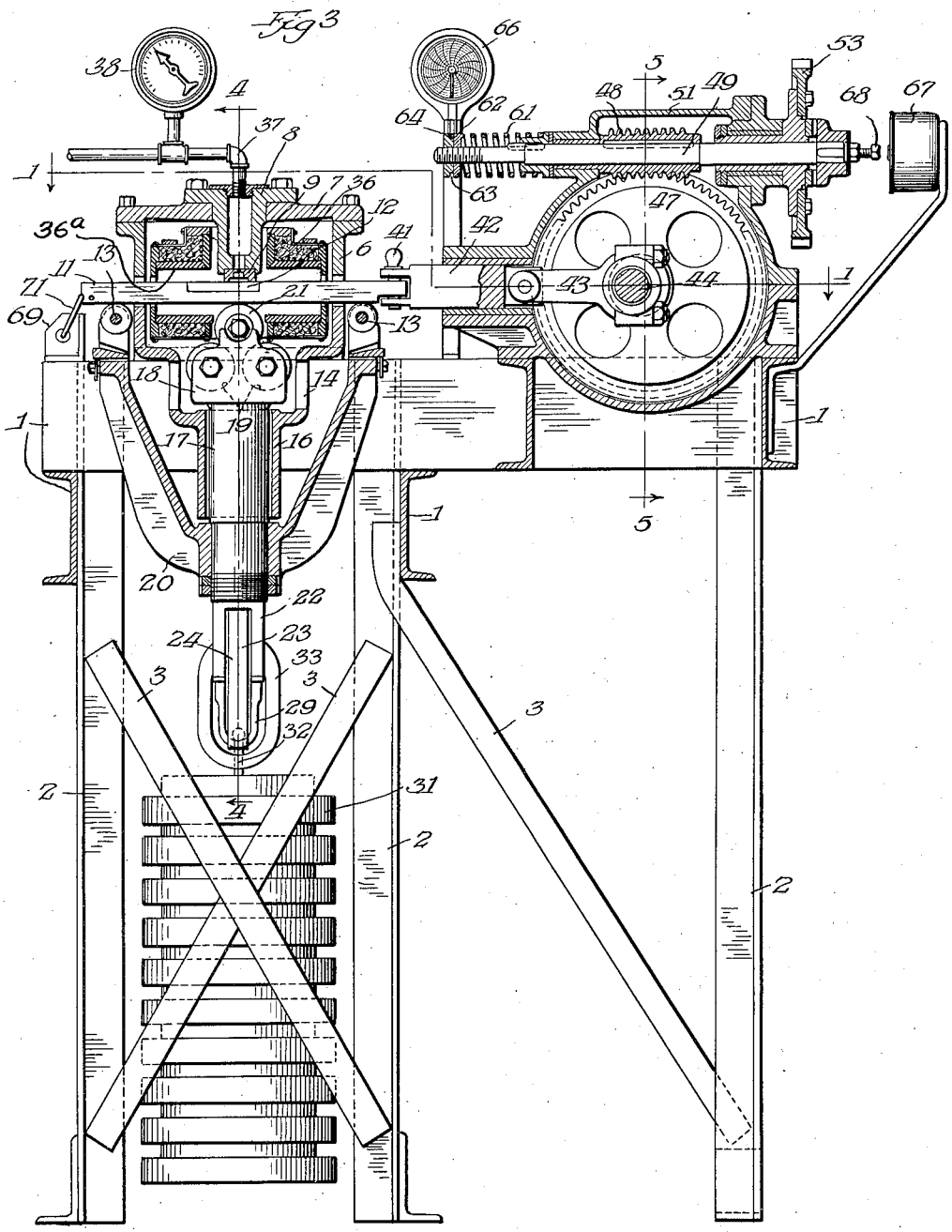

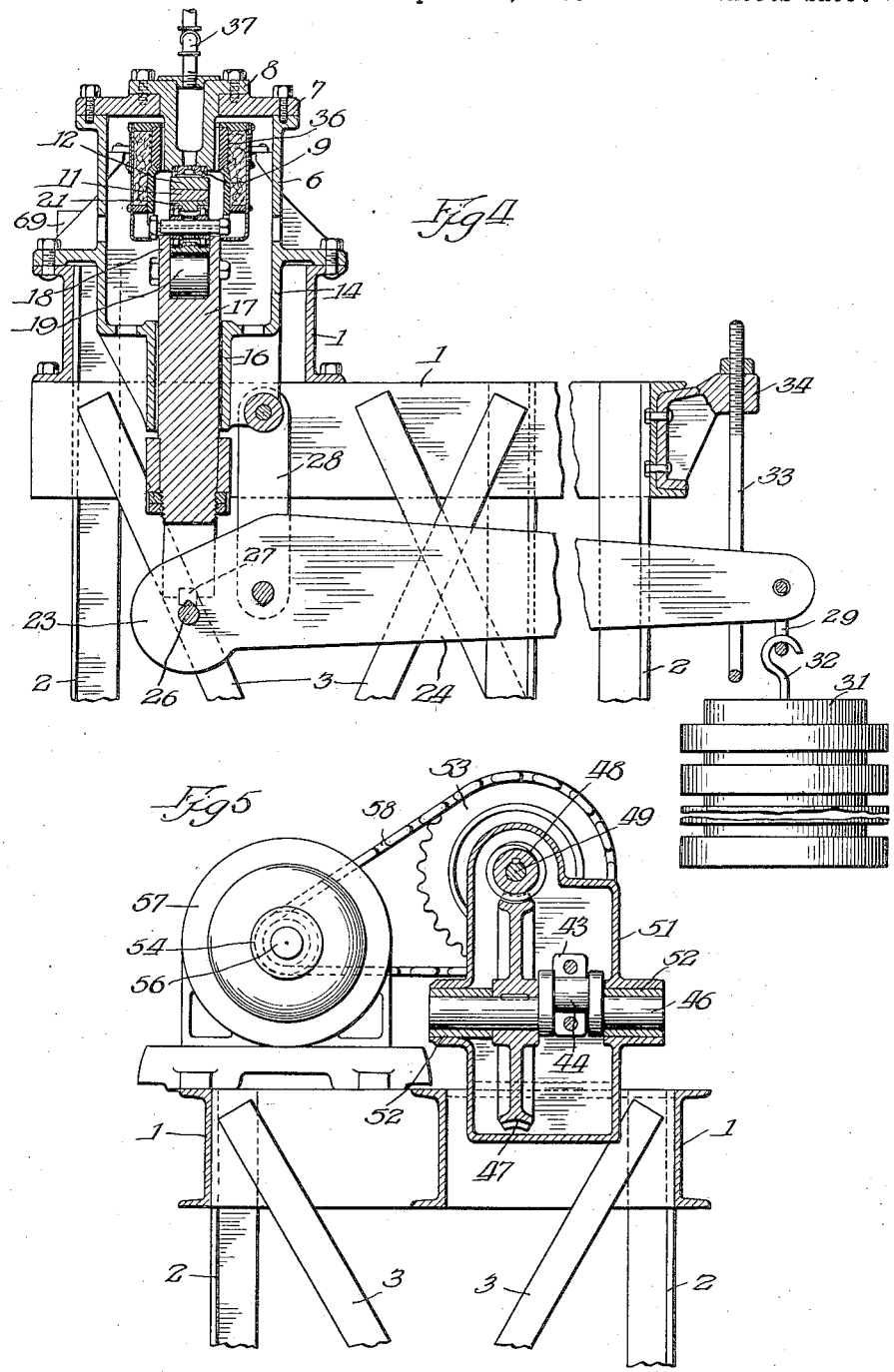

2,037,939

UNITED STATES PATENT OFFICE 2,037,939

WEAR TESTING MACHINE

Laverne W. Spring and Jerome J. Kanter, Chicago, Ill., assignors to Crane Co., Chicago, Ill., a corporation of Illinois Application April 17, 1930, Serial No. 444,979

7 Claims. (Cl. 73—51)

This invention relates to a machine for testing the resistance of a given material to wear and tear and more particularly for testing the effect upon two materials of similar or dissimilar composition when in rubbing contact against each other under pressure or subjected to corrosive or similar actions of other elements.

It is the purpose of this invention therefore to provide a machine which will test the wearing qualities of any desired material under actual working conditions to which the material would be subjected in use. Metal alloys for use as closure members of valves are one example of a material which may be tested. These alloys are subjected when in use to various conditions of pressure, temperature and chemical reactions of the fluids being handled by the valves.

It is the object of this invention therefore to provide a machine which will permit the testing and observation of metals when rubbed together and placed under varying conditions similating the actual use of these metals.

In accordance with this invention means are provided for repeatedly passing one sample of material over another sample of similar or dissimilar composition under varying conditions as to pressure, temperature, dryness, moisture, and the presence of other elements such as steam, corrosive gases, lubricants, etc. which would effect the chemical or physical condition of the material. Means are provided for continuously indicating and recording the conditions under which the materials are being tested. The machine is so constructed that the sample or samples being tested may be readily removed at any time during the operation of the machine to observe their conditions.

A better understanding will be had of this invention from a consideration of the following detailed description given in connection with the drawings in which:

Fig. 1 is a plan view partially in sections along the line 1—1 of Fig. 3 of a machine embodying the principles of this invention.

Fig. 2 is an end elevation of the machine shown in Fig. 1.

Fig. 3 is a vertical section on line 3—3 of Fig. 1.

Fig. 4 is a vertical section on line 4—4 of Fig. 3, and

Fig. 5 is a vertical section on line 5—5 of Fig. 3.

As is shown particularly in Figs. 1, 2 and 3 the machine is supported upon a bench of framelike construction 1 formed of structural steel forms to give rigidity to the machine. The tablelike structure or frame 1 is supported upon legs 2, the legs and frame being braced by cross struts 3.

In order that the samples being tested may be subjected to varying conditions which similate the actual conditions under which the sample will be used, the testing operation is done within a substantially closed box-like housing 6 having a cover 7. The stationary sample 9 is rigidly supported upon the end of a plate 8 which projects into the box through the cover thereof. The moving sample is carried by a bar 11 mounted for reciprocal movements immediately below plate 8. The side walls of the housing 6 are apertured to permit the ends of the bar to slide therethrough. The bar 11 is cut out to receive the moving sample 12. To guide the bar in its reciprocation with a minimum amount of friction loss rollers 13 are provided and placed under bar 11 at each side of housing 6 beneath apertures in the side walls thereof. Rollers 13 are adjustable as to elevation in order to align them with the center bar supporting roller later to be described.

The bottom of the housing 6 is formed with a depressed portion 14 which terminates in a cylindrical portion 16, the latter two portions serving to house and guide a pressure roller carriage 17. The upper end 18 of the carriage is bifurcated and serves as a support for a pair of rollers 19 upon which a third roller 21 rotates. The third roller is in contact with the lower surface of bar 11 immediately below stationary sample 9.

The roller carriage 17 and rollers thereon, serve as a medium through which pressure is applied to the under surface of bar 11 and consequently to samples 9 and 12 urging them into contact with each other. The lower end 22 of the carriage 17 is further guided by a bearing bracket 20. This end is also bifurcated to receive the end 23 of a lever arm 24 pivotally connected to carriage 17 by means of a fulcrum pin or knife edge 26 bearing in a knife block 27 set into the end 22 of carriage 17. The lever 24 is pivoted intermediate its ends to the frame 1 by a pair of links 28 and the free end thereof is provided with a swivel 29 to which any desired number of weights 31 may be hung by means of a hook 32. In order to limit the movement of the lever a retaining link 33 is provided, the latter being attached to the frame by a bracket 34. It is obvious that due to the lever arm 24 practically any desired pressure may be applied to the bar 11 forcing it upwardly against the stationary sample 9 thus causing the two samples to be urged toward each other under any desired pressure. The arrangement of rollers 13, 19 and 21 provides a practically frictionless mounting for the bar 11.

In order to subject the samples to any desired temperatures a furnace is inserted in housing 6. In the present illustration an electrical furnace 36 is provided constituting a wound resistance wire. The core 36a on which the resistance wire is wound is arranged to enclose the samples. The bar 11 reciprocates in said core. It is obvious that any suitable type of heater may be applied in place of that shown.

In order to further similate actual working conditions the plate 8 is tapped to receive a pipe connection 37 through which a suitable fluid such as water, steam or oil under any desired temperature or pressure may be applied to the samples. The stationary sample 9 is preferably drilled to permit the entry of fluid therethrough. Pipe line 37 may be provided with a suitable pressure gage or thermometer 38.

Any suitable means may be used to reciprocate the bar 11. In the present instance the end of the bar is connected by pin 41 to the end of a cross head 42, the other end of which is attached to a connecting rod 43 operating upon a crank pin 44 upon crank shaft 46. Shaft 46 carries a worm wheel 47 which meshes with a worm 48 upon drive shaft 49. The worm and worm wheel and associated shafts are encased within a casing 51 which also provides the bearings 52 for shaft 46. Worm shaft 49 is journaled for axial movement within the housing 51 as well as rotational movement therein and carries upon its outer end a sprocket 53 which is aligned with a sprocket 54 upon the motor shaft 56 of motor 57. A chain 58 serves to connect the two sprockets whereby shaft 49 may be rotated and bar 11 reciprocated from the motor.

As before stated, shaft 49 is mounted to permit axial movement thereof. This axial movement is restrained to movement in one direction and is resisted in this direction by coil spring 61 placed under compression between a collar 62 secured to the end of shaft 49 and the end of housing 51. Collar 62 is formed of two sections one thereof being recessed to provide an annular groove 63 between the two sections adapted to receive a rod 64 which actuates an indicator 66.

If the friction between the two samples increases due to wear or other causes the force necessary to reciprocate bar 11 will become greater which will cause shaft 49 to move to the right from the position as shown in Fig. 3. This movement will be resisted by spring 61 and will be indicated by the indicator 66 which may conveniently be a recording indicator. To prevent any damage through a jamming of bar 11 causing shaft 49 to assume its extreme right position, an electrical switch mechanism is provided which will open the motor circuit and stop the machine. This switch mechanism comprises a switch 67 which is engaged by a set screw 68 secured to the right end of shaft 49.

In order to count the number of reciprocations of bar 11, a counter 69 is provided which is actuated by a lever 71 engaged by rod 11.

From the foregoing description it can be seen that there is provided a machine under which any practical working conditions can be similated, that is, any desired pressure can be applied to the two samples through the medium of lever 24 and weights 31. Various degrees of temperature may be applied by the furnace 36, also any degree of moisture or the action of any fluids may be reproduced by inserting and/or circulating the proper medium through pipe 37.

By means of the counter, weights, gage, and indicator, exact conditions of the test may be continuously noted or noted at any desired intervals. If it is desired to examine the stationary samples plate 8 may be removed and with it sample 9. If it is desired to examine the lower movable sample, pin 41 may be removed and bar 11 removed from the housing.

By the use of a machine embodying the principles of this invention a careful and accurate study can be made of the behavior of various liquids, fluids, gases and the like under conditions of varying densities, temperatures, and/or viscosities. Briefly, the quality of lubricants, for example, under simulated, uniform conditions, may be determined by actual observation of their performance under conditions closely simulative of the actual. It will be apparent that such testing of a liquid would be carried out by introducing the liquid through 37 and determining its effect upon the effort to rub together metallic parts 9 and 12 and its effect upon the wear of such parts in a given time, under given conditions as to the pressure of said parts one against the other and as to the extent of movement.

It is obvious that many changes may be made in details of construction without departing from the spirit and scope of this invention as defined by the claims appended hereto.

We claim:

1. In a testing machine for testing samples of metallic material in rubbing contact, a substantially closed housing having a heater therein, a removable support for a stationary sample projecting from said housing into said heater, a reciprocating support for a second sample within said heater, said supports being arranged to maintain said samples in contact with each other during reciprocations of said latter support, means for reciprocating said support for said second sample, means for applying pressure to said supports to urge them together, and means for introducing liquids through one of said supports to the contacting surfaces of said samples.

2. In a testing machine for testing samples of metallic material in rubbing contact, a substantially closed housing, a removable support for a stationary sample projecting into said housing, a reciprocating support for a second sample extending through said housing, said supports being arranged to maintain said samples in contact with each other during reciprocations of said latter support, means for reciprocating said latter support, a roller within the housing engaging said reciprocatory support, means for forcing said roller against said reciprocating support to urge said supports together, and adjustably mounted rollers outside said housing for supporting said reciprocating support.

3. In a testing machine, a stationary support for a sample to be tested, a horizontally and vertically movable support for a second sample to be tested in conjunction with said first sample, means for reciprocating said movable support horizontally with respect to said stationary support, means for moving said latter support vertically while permitting horizontal movement thereof to apply a pressure to said samples to urge them together during reciprocations of said latter support, said latter means including a pressure roller engaging said movable support at a point opposite said stationary support, and means for indicating the relative effort necessary to move said movable support.

4. In a testing machine, a stationary support for a sample to be tested, a horizontally and vertically movable support for a second sample to be tested in conjunction with said first sample, means for reciprocating said movable support horizontally with respect to said stationary support, means for moving said latter support vertically while permitting horizontal movement thereof to apply a pressure to said samples to urge them together during reciprocations of said latter support, said latter means including a carriage, a plurality of rollers carried thereby, one of said rollers engaging said movable support at a point opposite said stationary support, and means for moving said carriage toward said stationary support, and means for indicating the relative effort necessary to move said movable support.

5. In a testing machine for testing samples of metallic material in rubbing contact, a stationary support for a sample to be tested, a movable support for a second sample to be tested in conjunction with said first sample, a driving shaft mounted for rotary movement and axial movement in one direction and means connecting it to said movable support for reciprocating the movable support with respect to said stationary support, means for applying a predetermined pressure to said samples to urge them together, and means for recording the axial movements of said shaft against said resistance to determine the effort necessary to move said movable support.

6. A testing machine comprising a housing, means within the housing for holding two samples of metallic material in rubbing contact, said means comprising coacting sample holders relatively movable for rubbing the samples one against the other and also relatively movable for pressing the samples together, one of said sample holders and the sample held thereby being bored for introducing fluids between the contacting surfaces of the samples, said sample holder having a pipe connection for supplying such fluids, a heater within the housing comprising a resistance winding and a core therefor enclosing the samples, the respective sample holders with their samples being movable from the housing, and operating means for producing the rubbing action of the samples.

7. A testing machine comprising a housing having a removable cap, a tubular electric heater mounted in the housing, a reciprocatory sample holder in the bore of the heater, a fixed sample holder projecting from said cap and extending laterally through the heater, means slidably supporting said reciprocatory support and adjustable to press the sample carried thereby against the sample carried by said fixed support, and operating means for said reciprocating support.

LAVERNE W. SPRING.
JEROME J. KANTER.